(No Model.)
E. H. ARGENT.
TYPE WRITING MACHINE.
No. 387,132. Patented July 31, 1888.
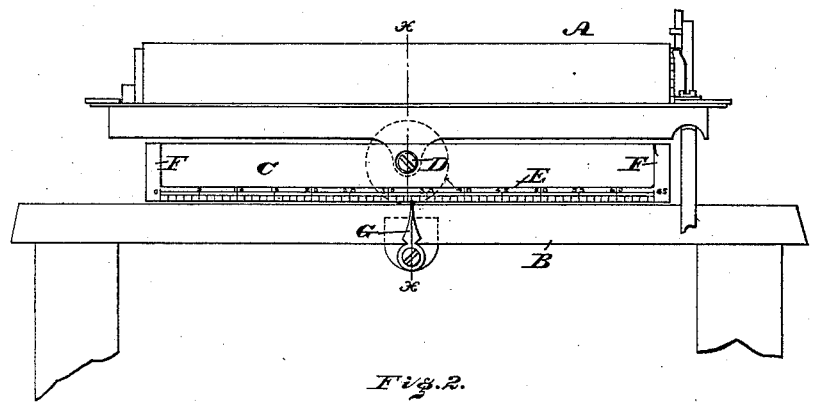
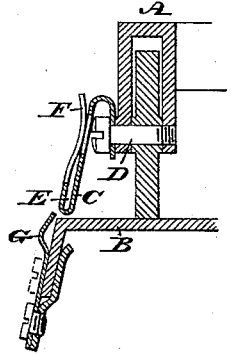
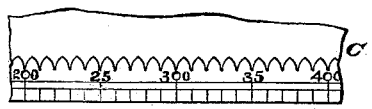
WITNESSES:
A. P. Grant
W. F. Kircher
INVENTOR:
Edward H. Argent
BY John A. Diedersheim
ATTORNEY.

UNITED STATES PATENT OFFICE.

EDWARD HEPWORTH ARGENT, OF NEW YORK, N. Y., ASSIGNOR OF ONE-HALF TO J. WALTER EARLE, OF PHILADELPHIA, PENNSYLVANIA.

TYPE-WRITING MACHINE.

SPECIFICATION forming part of Letters Patent No. 387,132, dated July 31, 1888.

Application filed March 13, 1886. Serial No. 195,106. (No model.)

*To all whom it may concern:*

Be it known that I, EDWARD HEPWORTH ARGENT, a citizen of the United States, residing in the city, county, and State of New York, have invented a new and useful Improvement in Type-Writing Machines, which improvement is fully set forth in the following specification and accompanying drawings, in which—

Figure 1 represents a front view of a portion of a type-writing machine embodying my invention. Fig. 2 represents a vertical section thereof in line $x\ x$, Fig. 1. Fig. 3 represents a front view of a detached portion of another feature of my invention.

Similar letters of reference indicate corresponding parts in the several figures.

My invention relates to improvements in type-writing machines; and it consists in a scale or slip-holder adapted to be secured thereto and constructed as herein described and claimed.

Referring to the drawings, A represents the front portion of the carriage of a type-writing machine, and B represents the front portion of the body of the machine.

C represents the scale or slip-holder, which is made of a piece of metal or other suitable material attached by a screw, D, to the portion A of the carriage, and having at its lower end a groove or trough, E, extending the length of said holder, it being adapted to contain and hold a slip of paper or card-board. At the ends of the holder C are springs F, which bear against the strip or piece of paper or card-board placed in the holder and serve to retain the same securely in position.

The wall or plate forming the front of the groove or trough E has its upper edge marked with teeth, graduations, notches, or openings, forming a scale or guide.

Connected with the portion B of the body is a pointer, G, consisting of a piece of metal or other material fixed to said portion, its point being in close proximity to the lower edge of the scale or slip-holder and in front thereof.

The operation is as follows: In the groove or trough of the scale or slip-holder is placed a slip of paper or card-board of the same width, or marked so as to show the width, of the paper which is on the roller. As the operator strikes the keys, the scale or slip-holder travels to the left, carrying the slip of paper with it. The pointer indicates on the slip the exact place where the type will next strike. As the keys are struck, the slip passes in the direction to the left of the pointer, thus indicating to the operator the precise portion of the sheet of paper he is printing upon and the progress he is making with the line. On the slip may be written or printed any marks which the operator may wish as a guide in his printing—for instance, to show the limits of margins or the position of figures or letters. Instead of a slip of paper or card-board, an envelope or card may be inserted, if desired.

Among advantages of the invention are the following: The operator is enabled to print with ease and rapidity all kinds of tabular statements, or statements where it is necessary to keep within certain margins, or to write columns of figures or letters in a certain position. The confusion and inconvenience arising from the reverse movement (from right to left) of the scales at present in use on the best known and most widely used type-writing machines is completely remedied, and in its place is substituted a convenient movement—namely, from left to right, or what is equivalent thereto—for, as the pointer is stationary and the scale travels from right to left, the effect is the same to the operator as if the scale were fixed and the pointer traveled from left to right. The fixed pointer indicates to the operator the exact spot where the type strikes, which is a great convenience to him in performing his work, such as making headings, &c. The operator has only to look at one spot—namely, the tip of the pointer—to watch the progress of the line he is writing, instead of having to watch the entire length of the scale, (from six and a half to nine and a half inches,) as in the ordinary reverse action, pointer, and scale. Any width of paper may be written upon—from the widest paper the carriage will hold down to the narrowest—without trouble to the operator, who is thus enabled to write on cards, envelopes, &c., without danger of overrunning the edge any more than in writing with a pen. The slip-holder and scale are easily and quickly attached to the type-writing machine, and do not interfere with its action or mechanism or impede its movement in any way.

Having thus described my invention, what I claim as new, and desire to secure by Letters Patent, is—

1. In a type-writing machine, a carriage with a slip-holder secured thereto on the front thereof, and a pointer secured to the frame of the machine, said parts being combined substantially as described.

2. In a type-writing machine, a carriage with a metallic slip-holder attached thereto, said slip-holder having its upper edge notched, forming a scale, in combination with a pointer attached to the frame, all as described.

3. A slip-holder having a groove or trough in its lower part and end springs whereby a slip of paper may be secured therein, said holder being adapted to be connected to the carriage of a type-writing machine, all substantially as described.

4. A slip-holder for a type-writing machine having a notched or toothed portion forming a scale or guide, substantially as described.

EDWARD HEPWORTH ARGENT.

Witnesses:
ALEXANDER LEATHEM,
FRANK E. FITCH.